United States Patent [19]
Herve

[11] Patent Number: 6,085,600
[45] Date of Patent: Jul. 11, 2000

[54] TORQUE MEASURING DEVICE FOR WINDOW REGULATOR

[75] Inventor: Nomerange Herve, Caen, France

[73] Assignee: Meritor Light Vehicle Systems, France

[21] Appl. No.: 08/785,627

[22] Filed: Jan. 17, 1997

Related U.S. Application Data

[63] Continuation of application No. PCT/FR95/00954, Jul. 17, 1995.

[51] Int. Cl.[7] .................................................... G01L 3/10
[52] U.S. Cl. ................................ 73/862.329; 73/862.326
[58] Field of Search ...................... 73/862.321, 862.324, 73/862.325, 862.326, 862.328, 862.329

[56] References Cited

U.S. PATENT DOCUMENTS

| | | | |
|---|---|---|---|
| 3,844,168 | 10/1974 | Tenkman | 73/862.329 |
| 4,488,443 | 12/1984 | Parkinson | 73/862.329 |
| 4,602,515 | 7/1986 | Eichenlaub | 73/862.329 |
| 4,683,746 | 8/1987 | Cullingford et al. | 73/118.1 |
| 5,450,761 | 9/1995 | Zilberman et al. | 73/862.329 |

*Primary Examiner*—Ronald L. Biegel

[57] ABSTRACT

This invention relates to a device for measuring torque in a window regulator mechanism. Two facing discs on the drive shaft have encoding means, the differential in position between each disc's encoding means being a relative measure of torque between the two discs and, resultingly, a measure of the torque on the drive shaft.

11 Claims, 2 Drawing Sheets

TORQUE MEASURING DEVICE FOR WINDOW REGULATOR

This is a continuation of PCT/FR95/00954 Jul. 17, 1995.

BACKGROUND OF THE INVENTION

The present invention relates to a torque-measuring device.

More specifically, the invention relates to torque-measuring devices which are inserted between two coaxial drive shaft portions connecting a driving member and a driven member.

Such devices are used, for example, in motor vehicle electric window lifter assemblies or in vehicle electric sunshine roof assemblies.

It is known that one of the most important problems regarding the operation of such window lifter assemblies is their operating safety and in particular the control of their operation when any object becomes jammed between the window and the rest of the door of the vehicle.

This operation can be controlled, for example, on the basis of the rotational speed of the output shaft of the motor for driving these assemblies, of the current drawn by this motor, or alternatively of the resistive torque applied to the output shaft thereof.

The invention deals more specifically with devices of the last type.

Now, in the state of the art, torque-measuring devices are known which are inserted between two coaxial drive shaft portions connecting a driving member, such as an electric motor, and a driven member, such as a window lifter worm-and-wheel mechanism, and which include two discs arranged facing one another in planes which are more or less perpendicular to the axis of shaft portions and bearing at their periphery position-encoding means, each connected to one shaft portion and to one another by a block of elastically deformable material, while position-detecting means are arranged facing the position-encoding means of the discs.

The output of these position-detecting means is connected to means for determining torque by analysing data delivered by these position-detecting means.

It is also known that the position-encoding means and the corresponding position-detecting means may be formed of optical means or magnetic means.

In the state of the art, the position-detecting means comprise two sensors arranged facing the encoding means of the discs and the torque is determined on the basis of the output signals from these two sensors by analysing the shift between these signals, this shift resulting from a deformation of the block of elastically deformable material under the effect of the torque.

However, it will be understood that this structure has a certain number of drawbacks, especially on account of the number of parts needed and therefore the cost of producing these devices.

The purpose of the invention is therefore to solve these problems by proposing a torque-measuring device which is simple and reliable.

To this end, the subject of the invention is a torque-measuring device inserted between two coaxial drive shaft portions connecting a driving member and a driven member, of the type including two discs arranged facing one another in planes which are more or less perpendicular to the axis of the shaft portions and bearing at their periphery position-encoding means, each connected to one shaft portion and to one another by a block of elastically deformable material, and position-detecting means arranged facing the position-encoding means of the discs, the output of which is connected to torque-determining means, characterized in that the position-encoding means are formed of alternating axially projecting parts of the discs, extending facing the block of elastically deformable material, in that the position-detecting means comprise a position sensor arranged facing the alternating projecting parts and in that the torque-determining means comprise means of analysing the duty cycle of the output signals of the sensor.

Advantageously, means forming an axial spacer are arranged between the discs in the block of elastically deformable material.

BRIEF DESCRIPTION OF THE DRAWINGS

The invention will be better understood from reading the description which will follow, given solely by way of example and made with reference to the appended drawings, in which.

DETAILED DESCRIPTION OF THE PREFERRED EMBODIMENT

As may be seen in these figures, a torque-measuring device according to the invention can be incorporated into means of driving a motor vehicle window lifter.

Figure 1:
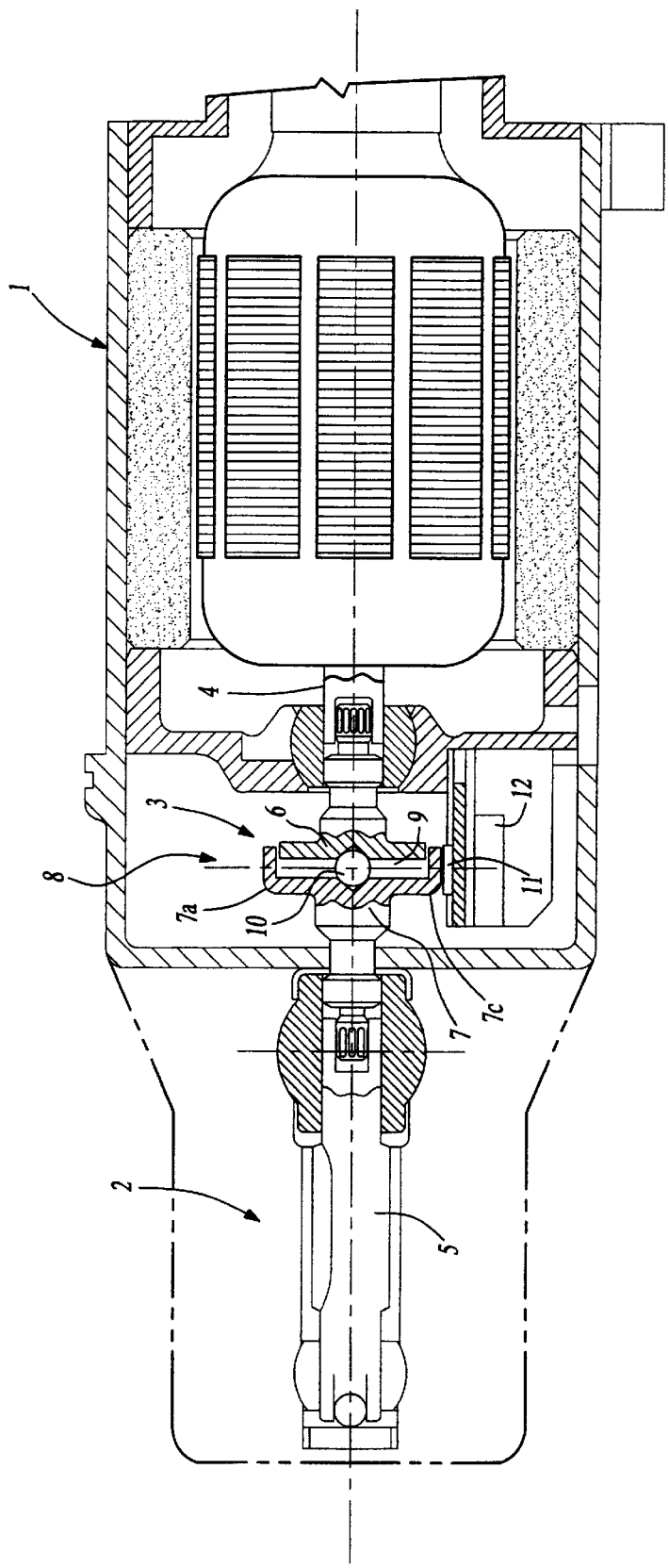
FIG. 1 represents a diagrammatic sectional view illustrating the structure of a window lifter drive mechanism including a torque-measuring device according to the invention.

These drive means comprise an electric motor denoted by the overall reference 1 in this FIG. 1 and a worm-and-wheel mechanism denoted by the overall reference 2 in this figure.

In this case, the torque-measuring device denoted by the overall reference 3 in these figures is inserted between two coaxial drive shaft portions connecting the electric motor 1 to the worm-and-wheel mechanism 2.

These shaft portions are denoted respectively by the references 4 and 5.

In fact, this torque-measuring device can be inserted between two coaxial drive shaft portions connecting any driving member and any driven member.

This measuring device includes two discs 6 and 7 arranged facing one another in planes which are more or less perpendicular to the axis of the shaft portions, the disc 6 being connected to the shaft portion 4 while the disc 7 is connected to the shaft portion 5.

As will be described in greater detail hereafter, these discs bear at their periphery position-encoding means denoted by the overall reference 8.

Furthermore, these discs are also connected to one another by a block 9 of elastically deformable material in which are arranged means forming an axial spacer which are denoted by the reference 10.

These means forming an axial spacer consist, for example, of a ball-shaped member interposed between the discs to avoid any problem of axial deformation by compression of the torque-measuring device.

Position-detecting means denoted by the overall reference 11 in this figure are also arranged facing the position-encoding means 8 of the discs and the output of these position-detecting means is connected to torque-determining means denoted by the overall reference 12.

Figure 2:
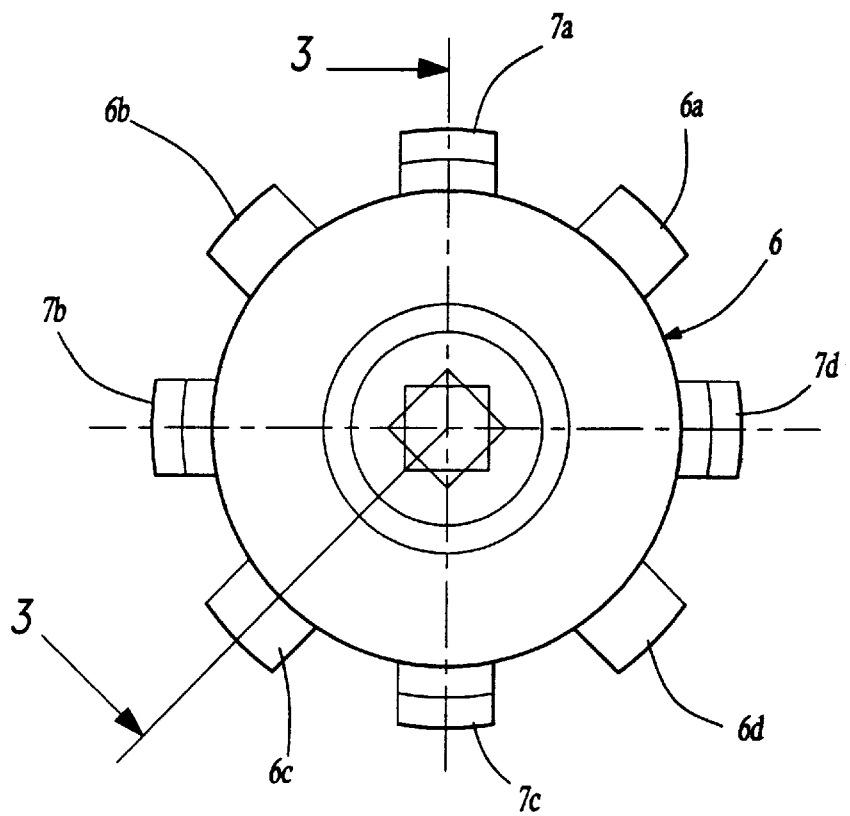
FIG. 2 represents a side view of a torque-measuring device according to the invention.
Figure 3:
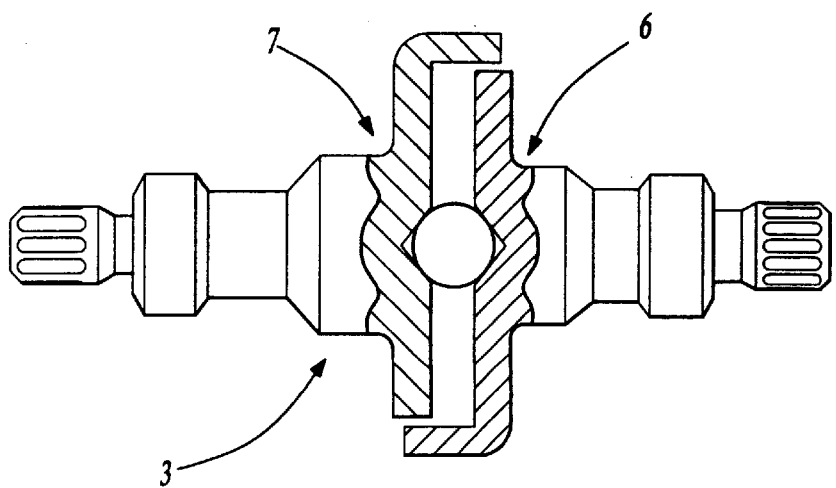
FIG. 3 represents a view in section on the line III—III of FIG. 2.

According to the invention, and as may be seen in these FIGS. 1 to 3, the position-encoding means are formed by alternating axially projecting parts of the discs 6 and 7 extending facing the block 9 of elastically deformable material.

Thus, in the embodiment represented in these figures, each disc of the torque-measuring device includes four axially projecting parts offset by 90° to each other and denoted by the references 6a, 6b, 6c, 6d and 7a, 7b, 7c, 7d respectively, for the discs 6 and 7.

These axially projecting parts of the discs 6 and 7 alternate as can be seen particularly in FIG. 2, the projecting parts of one of the discs being offset by 45° with respect to those of the other disc.

The position-detecting means 11 for their part comprise a position sensor arranged facing these alternating projecting parts and the torque-determining means 12 comprise means of analysing the duty cycle of the output signals of this sensor.

It will be understood therefore that, at rest, that is to say in the absence of any torque, the alternating axially projecting parts of the position-encoding means are distributed uniformly about the block of elastically deformable material.

When a resistive torque is applied to the measuring device, the elastically deformable block tends to deform, so that the discs become angularly offset from one another.

It will therefore be understood that the alternating axially projecting parts of these discs move closer together and further apart depending on this torque and that these are therefore no longer distributed uniformly around the block.

These variations in the position of these projecting parts are detected by the position sensor and the analysis means 12 connected to the output of this sensor allow the torque to be measured to be determined, on the basis of this variation in position, by analysing the duty cycle of the output signal of the sensor.

Thus this duty cycle of the output signal of this sensor is, for example,50% in cases where there is no torque, whereas when a torque is applied to this device, it may be determined on the basis of this duty cycle which is representative of this torque, as was explained earlier.

It will be noted that these position-encoding means of the discs may be formed by magnetic projecting parts thereof and that the position-detecting means may include a Hall-effect sensor.

However, optical means of detection may just as easily be used.

It will therefore be understood that the measuring device according to the invention offers a certain number of advantages insofar as it requires just one sensor to determine the torque.

Furthermore, this device has a built-in safety function insofar as it limits the deformation of the block of elastically deformable material by the fact that the alternating projecting parts of the discs come into abutment against one another to avoid any damage of this block.

Furthermore, it is also possible to provide projecting parts of different widths on the discs, this making it possible to detect the direction of rotation of the drive shaft portions by analysing the sequence of the signals delivered by the position sensor.

This analysis may also be carried out by the means of analysing the duty cycle of the output signals of this position sensor.

I claim:

1. Torque-measuring device inserted between two coaxial drive shaft portions (4, 5) connecting a driving member (1) and a driven member (2), of the type including two discs (6, 7) arranged facing one another in planes which are more or less perpendicular to the axis of the shaft portions and bearing at their periphery position-encoding means (8), each connected to one shaft portion and to one another by a block (9) of elastically deformable material, an axial spacer comprising a ball-shaped member arranged between the discs (6, 7) in the block of elastically deformable material, and position-detecting means (11) arranged facing the position-encoding means of the discs, the output of which is connected to torque-determining means (12), wherein the position-encoding means are formed of alternating axially projecting parts (6a, 6b, 6c, 6d, 7a, 7b, 7c, 7d) of the discs, extending facing the block (9) of elastically deformable material, in that the position-detecting means (11) comprise a position sensor arranged facing the alternating projecting parts and in that the torque-determining means comprise means (12) of analyzing the duty cycle of the output signals of the sensor.

2. A device according to claim 1, characterized in that the position-encoding means of the discs are formed of magnetic projecting parts and in that the position-detecting means comprise a Hall-effect sensor.

3. A device according to claim 2, characterized in that the encoding discs (6, 7) each comprise four axially projecting parts arranged at 90° from one another and offset by 45° with respect to the projecting parts of the other disc.

4. A device according to claim 2, characterized in that the said alternating projecting parts of the discs (6, 7) have different widths and in that the means (12) of analysing the duty cycle of the output signals of the sensor comprise means for detecting the direction of rotation of the coaxial shaft portions.

5. A device according to claim 1, characterized in that the encoding discs (6, 7) each comprise four axially projecting parts arranged at 90° from one another and offset by 45° with respect to the projecting parts of the other disc.

6. A device according to claim 1, characterized in that the said alternating projecting parts of the discs (6, 7) have different widths and in that the means (12) of analysing the duty cycle of the output signals of the sensor comprise means for detecting the direction of rotation of the coaxial shaft portions.

7. The torque measuring device of claim 1 wherein one of the two coaxial drive shaft portions is a driving shaft portion and the other is a driven shaft portion, the two discs comprising a driving disc and a driven disc, the driving disc connected to the driving shaft portion, the driven disc connected to the driven shaft portion, the driving shaft portion driving the driving disc which in turn drives the driven disc via the block of elastically deformable material, the driven disc driving the driven shaft portion.

8. The torque measuring device of claim 1 wherein the axial spacer is positioned between the drive shaft portions and rotatable relative to said drive shaft portions.

9. A torque measuring device for measuring torque between a driving shaft and a coaxial driven shaft comprising:

a driving disc and a driven disc facing one another in planes generally perpendicular to an axis of the shafts;

an elastically deformable material connecting the two discs, said driving disc driving said driven disc via said elastically deformable material, an axial spacer general coaxial with the drive shaft portions and rotatable relative to said drive portions, the axial spacer comprising a ball shaped member;

axially projecting parts extending from each of the discs generally toward the other disc, the projecting parts of the driving disc alternating with the projecting parts on the driven disc;

a position sensor arranged facing the projecting parts of the two discs, the position sensor generating a signal indicative of the torque.

10. The torque measuring device of claim 9 wherein the position sensor comprises a Hall-effect sensor.

11. The torque measuring device of claim 9 wherein the driving disc is connected to the driving shaft, the driven disc connected to the driven shaft, the driving shaft driving the driving disc which in turn drives the driven disc via the block of elastically deformable material, the driven disc driving the driven shaft.

* * * * *